3,577,257
METHOD FOR FORMING DECORATIVE POLYURETHANE COATINGS

George J. Hutzler, Williamsville, and Carl L. Schwenk, Cheektowaga, N.Y., assignors to Textron Inc.
No Drawing. Filed Oct. 30, 1968, Ser. No. 771,988
Int. Cl. B44d 1/16; B44c 1/06
U.S. Cl. 117—26      10 Claims

ABSTRACT OF THE DISCLOSURE

There is disclosed a method for forming decorative polyurethane coatings and in the procedure a solid substrate is coated with a liquid polyurethane composition, for instance, of the moisture-curing type. While the thus applied polyurethane is still tacky, particulate pigment solids bearing a curing aid for polyurethanes are placed on the coating. The solids-bearing coating is then covered with a clear polyurethane which again may be of the moisture-curing variety, and the curing air which is an integral part of the pigment solids has a curing effect on both the underlying and overlying polyurethane coatings. The pigmented solids thus exert a decorative or coloring effect through the overlying clear coating. The curing aid may be either of the catalytic or reactive type. Since the curing aid is included in the particulate solids which do not contact the polyurethane vehicles until they are in place on the supporting substrate, the vehicles as a result, have adequate working time, and construction jobs, for instance, wherein the vehicles are formed as a monolithic or seamless flooring can be planned and executed with facility. The particulate solids are frequently thin chips composed of finely divided pigment solids, binder and curing aid.

---

This invention relates to a method of curing polyurethane coating compositions which are, when in an essentially liquid state, placed both below and over particulate solids and are carried by a supporting surface. In one preferred embodiment the invention is concerned with the in-situ curing of a clear, moisture-curing polyurethane prepolymer coating after it has been applied over a solid substrate which bears a previously applied polyurethane coating on which are placed a large number of solid particles serving to impart a coloring and decorative effect to the clear polyurethane overcoat.

Polyurethanes are made by reaction of polyisocyanates and compounds having a plurality of hydroxyl groups. When formed as coatings, the polyurethanes exhibit outstanding properties with respect to toughness, strength, aesthetic appeal, resiliency, physical and chemical resistance and other desirable characteristics. In preparing these coatings there often is first made from the polyol and an excess of polyisocyanate, a prepolymer exhibiting a free isocyanate group content. The prepolymer itself or when dissolved in a solvent is in an essentially liquid state and can be formed as coatings usually by application to a solid substrate surface to which the coating adheres. The prepolymers can be cured after they are formed on the substrate, through reaction with moisture in the atmosphere and such prepolymers are usually referred to as moisture-curing. Alternatively, the prepolymers, shortly before application as a coating, can be mixed with additional polyol or other organic compounds bearing a plurality of active hydrogen atoms as determined by the Zerewitinoff test, e.g. polyamines, which exert a curing effect on the composition. Drying oil-based polyurethanes can be cured by contact with the oxygen of the atmosphere. Catalysts can be mixed in the coatings before application to the substrate to facilitate the curing reactions, but sometimes the adhesion of the coating to the substrate is diminished due to the presence of the catalyst.

These polyurethane coating compositions are often essentially clear and in many cases, for instance when used as floor coverings, it is desirable that the coating be colored and exhibit a design effect. Pigments can be added directly to the coating compositions before application to a substrate but there will be obtained a more or less smooth coating having an even color while in many cases it is desirable to have internal variations in the coating to give a textured effect and perhaps to have an uneven surface for an aesthetic appeal or to decrease the possibility of slipping on the surface. As a result, polyurethane coatings, especially floor coverings, have been formed by distributing pigmented particulate solids over a supporting surface bearing a first urethane coating, and then applying the clear liquid polyurethane coating composition over the solids to provide the desired polyurethane coating after curing.

These coatings are frequently applied on the substrate when the latter is in position at its location of ultimate use, although manufacturing of the coated substrates can be performed at a central site and the coated articles distributed for use. In any event, it is important to widespread and successful adoption of these techniques that the formation of the coatings be relatively routine which requires that the working time of the urethane be sufficient to provide an adequate period for the coating to be properly applied to the substrate. It has been found that in the absence of a catalyst or curing aid, curing of the coating compositions often takes too long and results in economic loss and inconvenience to manufacturers, workmen and the purchasers of the product. Slow curing causes job delays and efforts toward planning the application of the coating and related construction are therefore difficult. If curing takes place too rapidly, the coating may be applied improperly or curing may even occur before the coating operation can be finished which necessitates the disposal of valuable materials.

To avoid these problems, controlled amounts of catalysts have been added to the coating compositions prior to being applied to the supporting substrate, but the problems of unpredictable and rapid curing rates frequently occur. From a practical standpoint it is very difficult to compose a set of working instructions regarding catalyzation and application of the coatings with the expectation that the procedure will be satisfactory and more or less independent of the environmental conditions encountered and the type of pigmented solids employed. Moreover, when the catalyst is included in the composition it may reduce its stability to such an extent that the coating cures even while in storage or awaiting use and complete waste occurs. The presence of the catalyst can also diminish the ability of the coating to adhere to a substrate.

The foregoing problems have been solved or alleviated to a considerable extent by the method of the present invention. In this process a curing aid for the polyurethane coating composition is composited as an integral part of the solid particles prior to their being placed on a sticky, at least partially uncured undercoating of urethane carried by the supporting substrate surface. When the essentially clear, liquid polyurethane coating is applied over the supported solids, relatively fast, uniform curing is obtained under a wide range of environmental conditions and even when the chemical and physical characteristics of the solids are subject to the considerable variation.

By the method of this invention each of the essential polyurethane coatings, i.e. the sticky layer on which the solids are placed and the clear coating over the solids, can have an absence of curing aid which affords adequate working time with the polymer remaining in an essentially liquid state. The polyurethane undercoat thus does not cure past the tacky or sticky state for a relatively long period of time which permits proper application to the substrate surface and distribution of the curing aid-bearing solids over the coating. The solids exert a curing effect on this coating and even though adequate working time has been provided, curing can be completed when desired to give the required hard, durable coating. Moreover, the solids or portions thereof remaining exposed beyond or above the undercoating are available so that the curing aid in the solids causes relatively rapid curing of the essentially clear polyurethane overcoat even though the latter does not contain a curing aid and thus exhibits a satisfactory working time. Thus the curing aid-bearing solids sandwiched between the coatings serve to facilitate curing even with coating compositions having none or at least not a significant amount of curing aid and therefore of relatively long working time. A convenient and economical coating procedure is thereby provided.

The particle form solids employed in the method of the present invention are pigmented or colored materials integrally composited with a curing aid for the polyurethane coating composition. Often the solid particles are composed of finely divided, solid pigment or coloring materials held together by a suitable binder. The formed particles are capable of having an amount of curing aid such that when contacted with the polyurethane the rate of curing is significantly increased. Although the solids can merely be coated with the curing aid, it is preferred that the solids have sufficient absorbency so that when the curing aid as a liquid contacts the solids the liquid will pass into the composited particles. Alternatively, the curing aid, either as a liquid or solid, can be mixed with the finely divided pigment solids and then the mixture composited into the larger particles employed in the method of the present invention by the use of a binder and any suitable particle-forming technique. In any event, the composited solids are not a mere mechanical mixture of pigment and curing aid.

Either one or both of the pigment solids and binder in the composited particles of the present invention can be organic or inorganic. Usually the pigment solids form the major amount of the composited particles with the binder being present in a minor proportion. Also the curing aid for the polyurethane resin is a relatively small amount of the composited particles and yet sufficient to decrease the curing time of the polyurethane. Often such particles on a dry basis contain about 50 to 98, preferably about 70 to 90, weight percent of the finely divided pigment material, and about 2 to 50, preferably about 10 to 30, weight percent binder. The particles contain a minor amount of curing aid and often about 0.01 to 10, preferably about 0.02 to 3, weight percent based on the dry weight of the pigment and binder. If a liquid catalyst solution is employed as the curing aid in the composited particles the use of excessive amounts of the liquid may lead to agglomeration of the particles, especially when the curing aid is added to the particles by immersion of the latter into the curing aid.

The composited pigmented particles, in order to be most acceptable from an aesthetic standpoint in the coating compositions provided by the method of this invention, can be in the form of solids having at least one small dimension. In a preferred form the solids are relatively thin flakes that do not protrude unduly from the coating and yet impart a significant color thereto. The major dimensions of the flakes are often about 1/16 to 1 inch or more. If the flakes are circular, the major dimension is considered to be the diameter, whereas if the flakes are rectangular the major dimensions are taken as the length and width of the largest face. In actual practice, however, the flakes are often irregular in shape but still in essence have major dimensions across their dominant, flat surface of about 1/16 to 1 inch or somewhat more. The thickness or smallest dimension of the flakes or other solids is such that the final coating will more or less cover the solids when they are supported in a flat position on the underlying polyurethane. Since the solids are usually applied to the tacky polyurethane undercoating in a random fashion, for instance, by sprinkling or dropping, a considerable number of solids can overlap one another, especially if the solids are in the form of flakes. Since these overlapping solids are, for the most part, covered by one or more of the polymer coatings applied in the method of the present invention the solids are preferably correspondingly thin. Suitable composited pigmented solids include those having thicknesses of about 1 to 20 mil, and preferably the thickness of the solids is about 3 to 10 mils.

Materials employed as the colored solids in the composited pigmented particles can be organic or inorganic solids in finely divided form, conveniently composed primarily of particles of up to about 50 microns. The pigment solids may be any color, including black or white, and often particles having mixed colors or a mixture of particles of different colors are employed in making a coating composition according to the present invention. Examples of suitable pigment or colored materials include titanium dioxide, calcium carbonate, magnesium silicate, barytes, china clay, aluminum silicates, calcium sulfate, mica, metal flakes, wood, roofing granules, nut shells, plastic resins, and other stable, relatively inert materials.

As indicated above, the composited pigmented solids applied to the tacky polyurethane on the supporting substrate surface in the method of the present invention, can be provided by mixing the finely divided pigment solids with a binder and then forming larger composites according to any appropriate technique. The binders may be normally liquid or solid, organic or inorganic materials and may be used as solutions, slurries or even as dry solids. Among the binders suitable for use in forming the composited pigment particles of the present invention are vinyl acetate-acrylate-maleate terpolymers, vinyl acetate-acrylic copolymers, clay, cellulose esters, vinyl acetate-maleate copolymers, etc.

The polymer curing aid which forms an integral part of the pigmented composited solids used in the method of the present invention can be any type desired. Thus, the curing aid can be of the class of materials generally considered to be catalysts useful in promoting the curing of the polyurethane coating. Alternatively, the curing aid can be a material which would more readily be considered to be reactive with the polyurethane coating to provide further curing, for instance, by cross-linking. Mixtures of catalytic and reactive curing aids can also be employed.

Among the suitable catalytic curing aids are the various metal components employed to promote the formation and curing of polyurethanes. Among these metal catalysts are, for example, tin, zinc, titanium, cadmium, aluminum, copper, lead, bismuth and the like. These metals are usually employed as compounds, for instance, as the corresponding fatty acid salts, the inorganic acid salts, hydrocarbon-substituted metal oxides, hydrocarbon-substituted fatty acid salts, etc. Thus, the useful metal compounds include the chlorides, oxides, oleates, octoates, dialkyl metal dilaurates, nitrates, naphthenates, hexoates and similar catalyst components. Metallic driers exert a catalytic effect with respect to curing drying oil-based polyurethanes.

There can also be used as catalytic curing aids in the composited pigmented particles of this invention, the various basic organic accelerators which promote the formation and curing of polyurethanes. Notable among the basic organic accelerators are the tertiary amines such as triethylamine, N-coco-morpholine, dimethyl laurylamine, N-dimethyl-N-methyl-isopropyl propylene diamine, dimethyl aniline and the like.

Rather than use as the curing aid a material more normally considered as catalytic there can be employed a poly-functional material which is reactive with the polyurethane prepolymer and such reactive materials usually contain a plurality of active hydrogen atoms as indicated by the Zerewitinoff method. The compounds have active hydrogen-containing groups, for example, hydroxyl, primary and secondary amino groups, etc. Thus, the curing aid can be a polyamine or a polyalcohol, including the polyether polyols and polyalcohol polyamines. The polyalcohols and polyalcohol ethers useful as curing aids include those which can be employed in forming the polyurethane prepolymer and a variety of such materials are disclosed herein. Also useful curing aids are the polyamines among which are the aliphatic including cycloaliphatic, aromatic or mixed aliphatic-aromatic polyamines having at least two amino ($-NH_2$) groups per molecule. Often the polyamine has up to about 40 or more carbon atoms, preferably about 2 to 15 carbon atoms, and may contain other substituents which may be reactive or non-reactive with isocyanate groups. The preferred polyamines are diamines such as ethylene diamine, propylene diamine, hexamethylene diamine, para-phenylene diamine, methylene dianiline, 1-amino-3-aminomethyl-3,5,5-trimethyl cyclohexane, hexamethylenediamine, trimethylhexamethylenediamine, tolylene diamine, hydrogenated di-(aminophenyl) methane, etc.

The method of the present invention includes the application of an essentially curing aid-free polyurethane polymer liquid composition both below and over the pigmented composited solids. As previously noted the solids are distributed on a tacky polyurethane carried by a solid substrate, the latter often having an essentially planar surface of at least a foot or more, usually at least several feet, in width and length. The coating first placed over the solids can be called the flood coating. The curing aid in the composited solids then serves to facilitate curing of both the polyurethane underlying and flood coats.

The polyurethane coating on which the solids are deposited, can be pigmented in order to afford a background for the subsequently applied clear polyurethane polymer, whereby those portions of the latter which remain essentially transparent upon curing will appear to be the color of the undercoat, rather than exhibit the unpleasant color of many substrates, for instance, that of concrete, in those areas not covered by the solids. Alternatively, the substrate may be pre-coated or primed with paint or other pigmented coating to exert the background effect through clear coats of the polyurethane applied both beneath and over the curing aid-bearing solids. Since the underlying substrate may be composed of one or more of a variety of materials such as concrete, wood, linoleum, vinyl tile, ceramic tile, metal and the like, any adjacent coating should be selected so that it adheres well to the substrate.

Thus, in its most advantageous form the method of the present invention contemplates the application to the underlying solid substrate of one or more primer coatings. After the primer coating is dry to touch, a coating of an essentially curing aid-free polyurethane polymer can be applied over the primer as a body coat or undercoat. The composited, pigmented particles are then distributed, for instance, in a more or less even but random fashion, over the tacky surface of the polyurethane body coating. The solids enhance the curing rate of the underlying polyurethane body coat and they are effective in giving timely and uniform curing of the polyurethane polymer liquid flood coat when the latter is applied over the composited pigmented particles.

The amount of polyurethane polymer distributed over the solid particles is sufficient to cover most, if not essentially all, of the pigmented particles and thus the particles become embedded in this polyurethane flood or cover coat as the latter cures. After the polymer flood coat cures, one or more topcoats can be applied over the resulting polyurethane containing the pigmented particles. Frequently, it may be desirable to smooth the surface of the pigmented particle-containing coating, by rolling and/or sanding, prior to application of the topcoats in order to denude the surface of the cured polymer of protruding solid particles. It is not essential that the surface be smooth and in fact a textured or somewhat rough coating may be desired to improve appearance and avoid a pigmented coating of undue slickness. The topcoats can be any suitable coatings and, of course, are essentially transparent in order that the pigment in the polyurethane coating can be seen. Most advantageously, the topcoats are also polyurethane polymers as exemplified by those employed to cover the pigmented solid particles.

When covering floors and other solid substrates according to the method of the present invention, the proportions of polyurethane body or undercoat, pigmented composited solids and polyurethane flood coat employed depend upon factors such as the amount of color desired and the thickness of the coating to be provided. The same is true with respect to any primer, and topcoats formed. Although these factors lead to considerable variation in the amounts in many applications the pigmented solid particles can, for example, be applied to the substrate at a rate of about 5 to 20 square feet per pound of adjacent substrate surface, while the polyurethane undercoat and flood coat around the particles, and any primer and topcoats can with convenience be applied at a rate of about 100 to 500 square feet per gallon based on the adjacent substrate surface. Often the overall coating when used as a flooring has a thickness of about $\frac{1}{32}$ to $\frac{1}{8}$ inch. Each of the polyurethane body and flood coatings frequently has a thickness of about 0.001 to 0.01 inch, preferably about 0.004 to 0.006 inch. Also the various coatings in addition to the components already described may contain one or more of a variety of other materials such as ultraviolet light absorbers, flow control agents, flatting agents and anti-bubbling agents.

The urethane polymers used in this invention are essentially made by reaction of polyisocyanates with urethane-forming polyols and the urethanes prior to curing, which takes place after application of the urethane polymer as a coating, are in the essentially liquid state either as the polymer per se or dissolved in a solvent. The uncured polymer or prepolymer is generally stable in the sense that it will not cure to a solid unless further contacted with water, oxygen, polyol or other active-hydrogen containing material. The prepolymers can have a free isocyanate group content of about 1 to 25 or even 35 or more weight percent based on polymer content or solids.

The prepolymer-forming reaction mixture contains a ratio of total isocyanate groups to total hydroxyl radicals of at least 1.2:1, often up to about 3.5:1 or more. In the case of moisture-curing prepolymers this ratio is frequently 1.2 to 2.5:1, preferably 1.3 to 2.1:1, and the ratio of isocyanate groups to hydroxyl groups can affect the properties of the moisture-curing coating compositions. Increases in the ratio give coatings of greater film hardness and mar resistance while flexible and impact resistance may be adversely affected. Also, larger amounts of free isocyanate groups increase the toxicity and cost of the compositions. The free isocyanate groups in such moisture-curing prepolymers are often from about 3 to 12 weight percent, with about 5 to 10 percent being preferred, based on polymer content or solids.

In the case of polyol-curing prepolymers the prepolymer-forming reaction mixture generally contains a ratio of total isocyanate groups to total hydroxyl radicals of 1.4 to 3.5:1 or more, preferably 1.6 to 2.1:1. The ratio of isocyanate groups to hydroxyl groups can affect the properties of the coating composition, but undesirable results can be offset somewhat by using a polyol for curing of appropriate molecular weight, e.g. polyol whose major portion by weight has a molecular weight of at least about 500. With a given prepolymer, increases in the ratio of NCO to OH give coatings of greater film hardness and mar resistance while flexibility and impact resistance may be adversely affected, but these effects can be modified by using a long chain polyol for curing. The free isocyanate groups in such polyol-curing prepolymers are generally about 10 to 25 or even 35 or more weight percent, with about 15 to 20 weight percent being preferred, based on polymer content or solids.

The polyol component used in making the urethane polymer compositions of the present invention can be, as noted, one or more polyols, for instance, the diols, triols, other polyols, including the ether polyols, or their mixtures. The preferred polyols have at least two hydroxyl groups attached to aliphatic carbon atoms, and may be selected from a wide variety of polyhydroxyl materials which may be aliphatic, including cycloaliphatic, hydrocarbon compounds, including substituted-hydrocarbon compounds. Aromatic polyols or phenols may, if desired, be included in the polyurethane polymers but generally, less desirably so. The polyol may often have a molecular weight up to about 5000 or more, but preferably has a molecular weight of up to about 3000. As the molecular weight of the polyol increases at a given NCO/OH mole ratio in the reaction mixture for forming moisture-curing prepolymers, cured coatings of decreased hardness are obtained. On the other hand the same amount of isocyanate if employed with low molecular weight polyols can lead to moisture-cured coatings which are hard and brittle. Thus in moisture-cured coatings, brittleness and hardness are in general increased as the amount of diisocyanate is increased or the molecular weight of the polyol is reduced.

Representative polyol classes and individual compounds useful in making the various polymers are given below. In making the moisture-curing prepolymers of this invention it is preferred that the major portion of the total polyol component have a molecular weight of at least about 500. In the case of moisture-curing prepolymers it is preferred that they be made from polyols having 2 to 3 hydroxyl groups which may or may not be at the ends of the longest chain of the molecule. Also, when the polyol component used in making moisture-curing prepolymers contains lower molecular weight aliphatic polyol, which will often be the minor amount by weight of the total polyol, such lower molecular weight material preferably has a molecular weight of up to about 200. Sometimes in such cases the low and high molecular weight polyols are used in approximately equal molar ratios. In making the polyol-curing prepolymers it is preferred that on a weight basis the major portion up to all of the polyol has a relatively low molecular weight of up to about 200. In this case the aliphatic polyol added for curing can be one or more of the various types mentioned herein, but we prefer that the curing polyol be composed to a major extent on a weight basis, of aliphatic polyol having a molecular weight of at least about 500. The curing polyol may also be composed entirely of such high molecular weight material.

The polyol employed in making the polyurethane-type prepolymers or cured products of the present invention may be one or more polyhydric alkanols which can be the only polyol used or other polyols may also be employed. The alcohols have at least 2 carbon atoms, and among the wide variety of such materials which can be used are those represented by the formula:

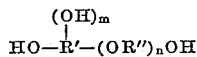

in which R' is an aliphatic hydrocarbon radical, preferably saturated, and R'' is an alkylene radical of 2 to 4, preferably 2 to 3 carbon atoms, R' preferably has 2 to 12, advantageously 2 to 6 carbon atoms. The letter $n$ represents a number from 0 to about 50, preferably 2 to 30 or even about 5 to 30, for more flexible coatings, while the letter $m$ is 0 to 2 or more. When $n$ is other than 0, R' may often be the same as R''. Also, $n$ may be a number which gives a polyol of desired molecular weight for making the prepolymer or for curing. The aliphatic alcohol reactant can be substituted with non-deleterious substituents and the lower molecular weight polyether glycols, e.g., of 2 to 4 ethylene oxide units, are suitable reactant materials, as are the polyether glycols made from alcohols of the type wherein $n$ is 0 and the alcohol is reacted with alkylene oxides of 2 to 4 carbon atoms, especially 2 or 3 carbon atoms, to obtain two or more —(OR'')$_n$OH groups per molecule.

The aliphatic alcohols include the polyether glycols (polyoxy alkylene glycols) of up to about 5000 or more molecular weight, such as the polyoxyethylene glycols, for instance, of up to about 3000 molecular weight, propylene glycol, polyoxypropylene glycols, for instance, of up to about 3000 molecular weight, ethylene glycol, glycerol, polyoxybutylene glycols, trimethylol propane, butanediols, trimethylol ethane, 1,6-hexamethylene glycol, 1,2,6-hexanetriol, sucrose, sorbitol, etc.

Others among the polyols useful in the invention include the hydroxy esters such as castor oil, polyol-modified castor oils, other polyol-modified non-drying and drying oils and hydroxy-terminated polyesters. The hydroxy-terminated polyester materials are generally made by reaction of one or more aliphatic polyhydroxy alcohols, such as the aliphatic polyols mentioned above, with one or more aliphatic, including cycloaliphatic, or aromatic polycarboxylic acids or esters, and such polyesters may have hydroxyl values in the range of about 25 to 150. Frequently in these polyesters, the polyhydroxy alcohols are predominantly diols and the acids are dicarboxylic acids, including their anhydrides, and preferably contain from 4 to 50 carbon atoms, e.g., phthalic acid, adipic acid, sebacic acid, dimers of olefinically-unsaturated mono carboxylic acids, such as linoleic acid dimer, etc. Modified castor oil partial esters can be made by ester interchange of the oil with polyols such as low molecular weight polyols, including glycols, glycerine pentaerythritol, etc.

The reaction of polyisocyanates with polyols does not of necessity give satisfactory coating compositions. Thus, the polymers must be stable and in an essentially liquid state, at least when in a solvent, to be useful as coating compositions. There is a greater tendency to produce intractable polymer gels when the polyol contains a cross-linking component which has at least three hydroxyl groups per molecule, yet such cross-linked polymers if of proper viscosity are highly desirable coating compositions.

The polymer compositions of the present invention therefore include those in which at least a portion of the polyol reactant is an aliphatic polyol having at least three hydroxyl groups per molecule such as those mentioned before including the polyols of the defined formula where $m$ is 1 to 2, e.g., trimethylol propane, trimethylol ethane, 1,2,6-hexanetriol, sucrose, sorbitol, etc. Such cross-linking aliphatic polyols often have about 3 to 12, preferably about 3 to 6, carbon atoms. When the polyol component used in making the polymer contains cross-linking polyol essentially the entire polyol may have at least about three hydroxyl groups per molecule and often at least about 10, preferably at least about 30, mole percent of the hydroxyl groups are supplied by the cross-linking polyol.

In making the urethane polymers of this invention one or more of a variety of hydrocarbon polyisocyanates, e.g. di or tri, can be employed. Although it is preferred that diisocyanates be the major portion of the polyisocyanate employed in preparing the polyurethane polymers used in this invention, minor amounts of other polyisocyanates may be present providing the compositions are not unduly deleteriously affected. The isocyanates can be aliphatic, aromatic or mixed aliphatic-aromatic structures. The aliphatic diisocyanates can be preferred, especially when making urethanes exhibiting good resistance to the yellowing effects of ultraviolet light. The aliphatic isocyanates include those having cycloaliphatic configurations and these are conveniently obtained by the hydrogenation of the corresponding aromatic and mixed aromatic-aliphatic isocyanates. The isocyanates may be substituted with non-interfering groups such as aliphatic hydrocarbon radicals, e.g., lower alkyl groups. The hydrocarbon portion of the isocyanate often has at least about 4 carbon atoms and usually does not have more than about 24 carbon atoms. Isocyanates of about 6 to 20 carbon atoms in the hydrocarbon group are preferred. Suitable isocyanates include completely hydrogenated di-(isocyanato phenyl) methane, 1-isocyanato-3-isocyanatomethyl-3,5,5-trimethyl cyclohexane, hexamethylene diisocyanate, completely hydrogenated tolylene diisocyanate, 2,4,4 - trimethylhexamethylene diisocyanate, 2,6 - tolylene diisocyanate, 2,4 - tolylene diisocyanate, p-phenylene diisocyanate, p,p'-diphenylmethane diisocyanate, 1,5-naphthalene diisocyanate, substituted aromatic and aliphatic polyisocyanate, etc. The use of aromatic isocyanates lowers the resistance of the urethane polymers to the deleterious effects of ultra-violet light.

The polyurethane polymer reaction products of the present invention can be made by simultaneous reaction of isocyanate and polyol. Alternatively, the isocyanate can be reacted with part or all of one or more of the polyols prior to the reaction with the remaining portion of these materials. Stepwise mixing of the isocyanate with the polyols may be used to enhance temperature control. The reaction temperatures for making the various urethane polymers of the present invention are often in the range of about 40 to 150° C., with about 50 to 130° C. being preferred; and the reaction is preferably continued until there is essentially little, if any, unreacted hydroxyl functionality remaining. As noted above variations in the nature and amounts of the polyols used in the preparation of the polymer coating compositions of this invention can be made.

The polymers of the present invention can be prepared in the presence of an essentially inert solvent. The solvent serves to insure that the reactants are in the liquid state and the solvent permits better temperature control during the reaction by serving as a heat sink and, if desired, as a refluxing medium. Various solvents including mixtures of such materials may be employed and among the useful organic solvents are aromatic hydrocarbons, esters, ethers, keto-esters, ketones, glycol-ether-esters, chlorinated hydrocarbons, and the like and mixtures thereof. Frequently, the solvents are volatile materials which will be removed from the composition while it cures as a coating or film, and in such case, there may be no need to remove any portion of the solvent from the reaction product prior to application as a coating. The amount of solvent employed may vary widely and large volumes may be uneconomical or give materials with undesirably or inconveniently low viscosity. The amount of solvent may be selected in order to provide a reaction product of film application viscosity, but products of greater viscosity can be cutback before use. Often about 0.25 to 6 weights of solvent, preferably about 0.5 to 3 weights of solvent, per weight of the total isocyanate and polyol in the polymer are used. Among the suitable normally liquid solvents are toluene, xylene, ethylbenzene, 2-ethoxyethyl acetate, 1,1,1-trichloroethane, methylisobutyl ketone, dimethylformamide, dimethylsulfoxide, dioxane, etc. and their mixtures; and it is preferred that the solvent not contain more than about 10 carbon atoms per molecule.

The following examples will serve to illustrate the present invention. In the examples the parts indicated are by weight and the percents NCO are reported on the basis of the total weight of the composition.

EXAMPLE I

One hundred grams of solid, pigmented composited chips were covered with 100 grams of a one percent by weight solution of dibutyl tin dilaurate in xylene. This mixture was allowed to stand for 15 minutes at room temperature. The solution of catalyst was poured off the chips, they were drained of excess solution and dried for 16 hours in an oven in air at 125° F. It was estimated that the dried chips contained about 0.030 weight percent dibutyl tin dilaurate.

Four commercial chips of about 7 mils thickness were treated in this manner and applied evenly but randomly over a tacky coating of polyurethane prepolymer covering a section of clean concrete flooring. The chips were distributed over the surface at a rate of 10 square feet per pound of chips. The chips were then covered with a coating of the same polyurethane prepolymer. The prepolymer was a moisture-curing liquid vehicle and in both coating operations was spread at a coverage rate of 128 square feet of surface per gallon of vehicle. The prepolymer vehicle was formed from polyoxypropylene glycol having a mole weight of about 1000 and tolylene diisocyanate reacted together in xylene so as to give a vehicle at 40% non-volatile having a viscosity of 100 centipoises and 2.5 weight percent free NCO.

The following table shows the comparison of tack-free curing times for the thusly formed coatings:

TABLE I

| Chip number [1] | Tack free times, minutes | |
|---|---|---|
| | Catalyst-bearing chips | Control (no catalyst in chips) |
| 1 | 55 | 130 |
| 2 | 75 | 140 |
| 3 | 80 | 135 |
| 4 | 80 | 140 |

[1] Chip No. 1 was composed of a vinylacetate-acrylic copolymer binder and 85.8 wt. percent of barytes-China clay pigment. Chip No. 2 was composed of vinyl acetate-acrylate-maleate terpolymer binder and 86.4 wt. percent barytes-China clay pigment. Chip No. 3 was composed of a cellulose ester binder and barytes-TiO₁ pigment. Chip No. 4 was composed of vinyl acetate-maleate copolymer binder and 95.1 wt. percent barytes-TiO₂ pigment.

These results show the effectiveness of the catalyst in facilitating curing of the polyurethanes when the catalyst is employed only as a component of the chips.

EXAMPLE II

The chips used in this example were made in the following manner. 830 parts water, 25 parts potassium tripolyphosphate, 190 parts of a polyelectrolyte-type dispersant (Daxad 30), 510 parts of hydroxyethyl cellulose (1.5% solution in water), 1150 parts vinyl acrylic latex, 3000 parts barytes, 1250 parts kaolin, 750 parts precipitated chalk, 10 parts of a silicone antifoaming agent, and none or an amount of curing aid as indicated below in Table II, were mixed at 13,500 r.p.m. in a Cowles dissolver.

This chip product was cast out by spreading on a polyethylene sheet covering a flat, solid surface using a variable gate Bird Applicator with a gate opening of 14 mils. Upon drying the sheet had a thickness of about 7 mils. The sheet so produced was allowed to dry at room temperature and was broken into small, randomly sized chips having for the most part a largest dimension of less than ½ inch.

Seven batches of chips were made according to this procedure with one batch containing no curing aid while each of the other batches included a curing aid as indicated in the separate runs of Table II. Seamless flooring was formed using the chips made as described above and in Table II. The chips were applied to a tacky polyurethane undercoat covering a clean concrete floor, at the rate of 10 square feet of floor per pound of chips using polyurethane prepolymer vehicle undercoat and flood coats each at a coverage of 128 square feet per gallon.

The vehicles were as designated A to D in Table II and in a given operation the undercoat was the same composition as the flood coat.

Table II shows the tack-free curing times for the coatings:

TABLE II

| Run | Amount of active curing aid [1] weight percent based on weight of chips (dry) | Tack-free times (minutes) for vehicle [2]— | | | |
|---|---|---|---|---|---|
| | | A | B | C | D |
| Control (no catalyst) | | 120 | 120 | 270 | 165 |
| 1 | 1 | 105 | | | |
| | 5 | 90 | | | |
| 2 | 1 | 70 | 110 | 180 | 130 |
| | 5 | 55 | | | |
| 3 | 1 | 110 | | | |
| | 5 | 75 | | | |
| 4 | 1 | 105 | | | |
| | 5 | 55 | 75 | 180 | 120 |
| 5 | 2 | 55 | 60 | 170 | 110 |
| 6 | 6 | 45 | | | |

[1] Curing aid description:
Run No:
1. 1-amino-3-aminomethyl-3,3,5-trimethyl cyclohexane.
2. Dibutyl tin dilaurate added in this and other runs in the form of a 50% by weight solution in butoxy diethylene glycol.
3. p,p'-Methylene dianiline added as a 25% solution in methyl ethyl ketone.
4. Tetrahydroxyethyl ethylene diamine.
5. 1% dibutyl tin dialurate and 1% tetrahydroxyethyl ethylene diamine.
6. 1% dibutyl tin dilaurate and 5% tetrahydroxyethyl ethylene diamine.

[2] Vehicle descriptions:
A. Prepolymer of Example I.
B. Prepolymer similar to that of Example I but prereacted with a small amount of water and having a percent NCO of 3.25 at 42% non-volatile in xylene and cellulose acetate.
C. Moisture-curing polyurethane prepolymer made from hydrogenated methylene diisocyanate and a castor oil based-polyol, non-volatile of 42% in xylene and cellulose acetate, Gardner viscosity of B and 2.87% of NCO.
D. Moisture-curing polyurethane prepolymer made form hydrogenated methylene diisocyanate and a polyoxypropylene hexantriol, non-volatile of 42% in xylene and cellulose acetate, Gardner viscosity of C and 3.2% NCO.

It is claimed:
1. A method for forming a decorative coating on a solid substrate which comprises coating the substrate with a curable liquid polyurethane composition, distributing over said coating while it is not cured past the tacky stage, particle form, colored, inert solids having integrally composited therewith a curing aid for said polyurethane, said solids being at least partially exposed beyond the surface of said coating, contacting said exposed solids and coating the previously applied solids-bearing coating with an essentially clear, liquid polyurethane composition which is curable by said curing aid, and allowing the polyurethane compositions to cure.

2. The method of claim 1 wherein the polyurethane compositions contain essentially no curing aid.

3. The method of claim 2 wherein the polyurethanes are moisture-curing.

4. The method of claim 1 wherein the solid particles containing the curing aid are composed of finely divided colored solids held together by a binder.

5. The method of claim 4 wherein the bound solids are particles in the shape of flakes having a thickness of about 1 to 20 mils.

6. The method of claim 5 wherein the polyurethane compositions are moisture-curing and the curing aid is a catalyst for the moisture-curing reaction.

7. The method of claim 6 wherein the polyurethane compositions contain essentially no curing aid.

8. The method of claim 7 wherein the polyurethane is formed from hydrocarbon diisocyanate and aliphatic polyol.

9. The method of claim 8 wherein the diisocyanate is toluene diisocyanate.

10. The method of claim 9 wherein the aliphatic polyol is polyoxypropylene glycol.

References Cited

UNITED STATES PATENTS

| | | | |
|---|---|---|---|
| 3,029,209 | 4/1962 | Ferrigno | 117—100X |
| 3,288,747 | 11/1966 | Sussman | 117—100 |
| 3,446,644 | 5/1969 | Murphy | 117—28X |

WILLIAM D. MARTIN, Primary Examiner

U.S. Cl. X.R.

117—27, 33, 161